(12) United States Patent
Ho et al.

(10) Patent No.: US 9,454,267 B2
(45) Date of Patent: Sep. 27, 2016

(54) TOUCH SENSING CIRCUIT AND METHOD FOR MAKING THE SAME

(75) Inventors: Kwan-Sin Ho, Miaoli (TW); Pingping Huang, Xiamen (CN); Jianbin Yan, Putian (CN); Hao Zhang, Jishou (CN); Zhixiong Cai, Longhai (CN); Tiefei Xiao, Hengyang (CN)

(73) Assignee: TPK TOUCH SOLUTIONS (XIAMEN) INC., Xiamen (CN)

( * ) Notice: Subject to any disclaimer, the term of this patent is extended or adjusted under 35 U.S.C. 154(b) by 90 days.

(21) Appl. No.: 13/077,974

(22) Filed: Mar. 31, 2011

(65) Prior Publication Data

US 2011/0304582 A1 Dec. 15, 2011

(30) Foreign Application Priority Data

Jun. 12, 2010 (CN) .......................... 2010 1 0204628

(51) Int. Cl.
*G06F 3/041* (2006.01)
*G06F 3/044* (2006.01)

(52) U.S. Cl.
CPC ..... *G06F 3/044* (2013.01); *G06F 2203/04103* (2013.01); *G06F 2203/04107* (2013.01); *G06F 2203/04111* (2013.01); *Y10T 29/49155* (2015.01)

(58) Field of Classification Search
CPC .......... G06F 2203/04103; G06F 2203/04107; G06F 2203/04111; G06F 3/044; Y10T 29/49155
USPC ................................................ 345/172–174
See application file for complete search history.

(56) References Cited

U.S. PATENT DOCUMENTS

| | | | |
|---|---|---|---|
| 4,639,720 A | 1/1987 | Rympalski et al. | |
| 2002/0186330 A1 | 12/2002 | Kawasaki | |
| 2007/0242054 A1* | 10/2007 | Chang et al. | 345/173 |
| 2007/0262966 A1* | 11/2007 | Nishimura et al. | 345/173 |
| 2008/0264699 A1 | 10/2008 | Chang et al. | |
| 2009/0075098 A1* | 3/2009 | Tsukahara et al. | H01L 51/5237 428/451 |
| 2009/0153509 A1 | 6/2009 | Jiang et al. | |
| 2009/0167703 A1* | 7/2009 | You et al. | 345/173 |
| 2009/0167711 A1* | 7/2009 | Jiang | G06F 3/044 345/173 |
| 2009/0242283 A1* | 10/2009 | Chiu | G06F 3/044 178/20.01 |
| 2010/0045614 A1 | 2/2010 | Gray et al. | |
| 2010/0060602 A1* | 3/2010 | Agari et al. | 345/173 |
| 2010/0073310 A1* | 3/2010 | Liang et al. | 345/173 |
| 2010/0134436 A1 | 6/2010 | Jeong et al. | |

(Continued)

FOREIGN PATENT DOCUMENTS

| | | |
|---|---|---|
| CN | 1185844 | 6/1998 |
| CN | 1975649 | 6/2007 |

(Continued)

OTHER PUBLICATIONS

Capacitive Sensors: Design and Applications; Larry K. Baxte (1997).

*Primary Examiner* — Quan-Zhen Wang
*Assistant Examiner* — Tony Davis
(74) *Attorney, Agent, or Firm* — Cooper Legal Group, LLC (57) ABSTRACT

The present invention discloses a touch sensing circuit for capacitive touch panel formed on a substrate comprises a transparent conductive layer having a thickness of 100 Å-500 Å; a conductive layer having a thickness of 1000 Å-5000 Å; and an insulating layer having a thickness of 1 μm-5 μm disposed between the transparent conductive layer and the conductive layer.

20 Claims, 9 Drawing Sheets

(56) References Cited

U.S. PATENT DOCUMENTS

| | | | |
|---|---|---|---|
| 2010/0147368 A1* | 6/2010 | Rubin | 136/255 |
| 2010/0295819 A1* | 11/2010 | Ozeki | G06F 3/044 345/174 |
| 2011/0011632 A1* | 1/2011 | Nakao et al. | 174/257 |
| 2011/0032209 A1* | 2/2011 | Kim | G06F 3/044 345/174 |
| 2011/0050625 A1* | 3/2011 | Kim | G06F 3/044 345/174 |
| 2011/0134073 A1* | 6/2011 | Ahn | 345/174 |
| 2011/0141038 A1* | 6/2011 | Kuo et al. | 345/173 |
| 2011/0157086 A1* | 6/2011 | Ozeki | G06F 3/044 345/174 |
| 2011/0304582 A1* | 12/2011 | Ho | G06F 3/044 345/174 |
| 2012/0062487 A1 | 3/2012 | Lee et al. | |
| 2012/0200815 A1* | 8/2012 | You et al. | 349/123 |

FOREIGN PATENT DOCUMENTS

| | | |
|---|---|---|
| CN | 101131492 | 2/2008 |
| CN | 201078769 | 6/2008 |
| CN | 201107503 | 8/2008 |
| CN | 101261379 | 9/2008 |
| CN | 101261558 | 9/2008 |
| CN | 101272521 | 9/2008 |
| CN | 101324827 | 12/2008 |
| CN | 101334702 | 12/2008 |
| CN | 101349960 | 1/2009 |
| CN | 101359265 | 2/2009 |
| CN | 101441545 | 5/2009 |
| CN | 201289637 | 8/2009 |
| CN | 201298211 | 8/2009 |
| CN | 101587391 | 11/2009 |
| CN | 201374687 | 12/2009 |
| CN | 201429837 | 3/2010 |
| CN | 101893976 | 11/2010 |
| CN | 101907944 | 12/2010 |
| CN | 201741139 U | 2/2011 |
| CN | 202084024 | 12/2011 |
| CN | 102467291 | 5/2012 |
| EP | 1986084 | 10/2008 |
| EP | 2290512 | 3/2011 |
| EP | 2530565 | 12/2012 |
| JP | 58171573 | 10/1983 |
| JP | 61173333 | 8/1986 |
| JP | 2008310551 | 12/2008 |
| JP | 3149113 | 2/2009 |
| JP | 2010033478 | 2/2010 |
| JP | 2011198839 | 10/2011 |
| KR | 1020090124888 | 12/2009 |
| KR | 1020090131638 | 12/2009 |
| TW | M345294 | 11/2008 |
| TW | 200923536 | 6/2009 |
| TW | M364912 | 9/2009 |
| TW | M368846 | 11/2009 |
| TW | 201017264 | 5/2010 |
| TW | 201019192 | 5/2010 |
| WO | 2010029979 | 3/2010 |

\* cited by examiner

TOUCH SENSING CIRCUIT AND METHOD FOR MAKING THE SAME

BACKGROUND OF THE INVENTION

1. Technical Field

This Application claims the benefit of People's Republic of China Application No. 201010204628.5, filed Jun. 12, 2010.

The present invention generally relates to touch sensing technology, and more particularly to a touch sensing, circuit for a capacitive touch panel and a method for making the circuit.

2. Description of the Prior Art

In recent years, the touch panel is becoming more and more popular, and may replace mouse and keyboard in the future. Touch panels have been widely used in home appliances, communication devices, and electronic information products such as personal digital assistant (PDA), and game input interface. Now, a touch panel is always integrated with a display panel, so a user can select an operation by directly touching the corresponding images shown, on the display panel. Therefore, such a combined structure of the touch panel and the display panel provides users with better portability and more comfortable input operation.

There are many types of touch panels, such as resistance touch panel, capacitive touch panel, infrared sensing touch panel, electromagnetic sensing touch panel, and acoustic wave sensing touch panel, according to different technology principles. Herein, the capacitive touch panel is a comparatively better type because of its high sensitivity, low cost, and simple structure. Theoretically, the capacitive touch panel detects the capacitance changes of the electrodes generated by human body or other grounded material to determine the touch position.

Figure 1:
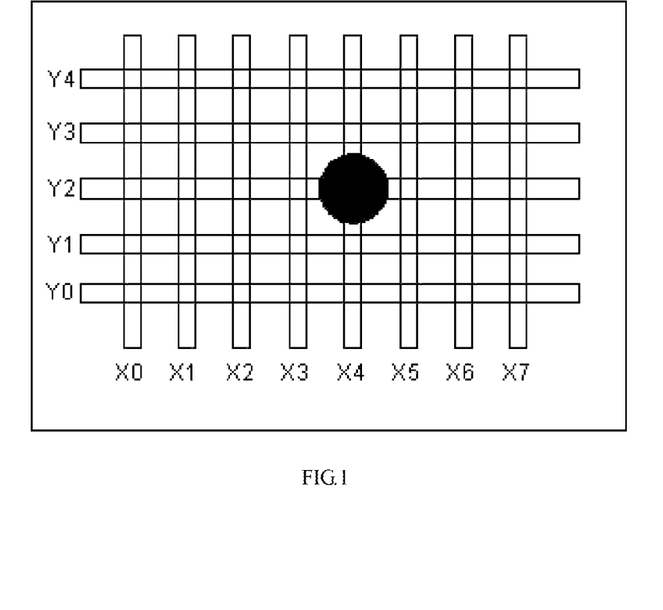
FIG. 1 is a schematic view showing the detecting principle of conventional capacitive touch panel.

Referring to FIG. 1, a conventional capacitive touch panel includes a sensing circuit pattern, made of conductive materials and formed on a transparent glass. The circuit pattern has x-axis (X0-X7) and Y-axis (Y0-Y4) electrode strips. In operation, a control circuit scans the electrode strips sequentially. When a human finger or other grounded conductors touch a point (shown as black area) of the capacitive touch panel, the capacitance of the X-axis electrode strips and Y-axis electrode strips which is touched changes. After sensing the capacitance change of the electrode strips, the control circuit will determine the X-axis and Y-axis coordinates of the touched position based on the capacitance changes.

Figure 2:
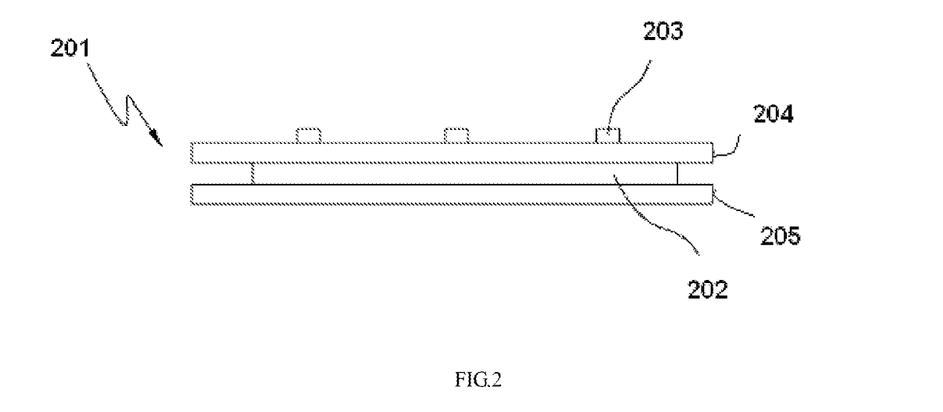
FIG. 2 is a schematic view of the structure of a touch sensing circuit of the conventional capacitive touch panel shown in the FIG. 1.

As is well known, to detect the location touched by finger or touch pen, various touch detection methods for capacitive touch panels have been employed. For example, as shown in FIG. 2, a touch sensing circuit 201 having a grid pattern for a capacitive touch panel formed on a substrate 205 includes a first capacitive sensing layer 202, a second capacitive sensing layer 203, and an insulating layer 204. The first capacitive sensing layer 202 and the second capacitive sensing layer 203 are spaced by the insulation layer 204 so as to achieve an effect of capacity. Each capacitive sensing layer includes a number of conductive elements arranged in substantially parallel rows. The conductive elements of the first capacitive sensing layers are perpendicular to the conductive elements of the second capacitive sensing layer. Each conductive element includes a number of electrode units. The conductive elements are made of indium tin oxide (ITO).

However, the above mentioned touch sensing circuit has two sensing layer 202 and 203 which make the structure thick. Furthermore, the conductive elements are made of indium tin oxide, therefore the whole resistance of the touch sensing circuit can not be reduced effectively. Consequently, a sensitivity of signal transmission can not be enhanced.

Therefore, a new touch sensing circuit having not only a comparatively thinner structure but also a comparatively lower impedance is needed to overcome said shortcomings.

BRIEF SUMMARY OF THE INVENTION

The present invention is to provide a touch sensing circuit for a capacitive touch panel and a method for making the same that can simplify the whole manufacturing process by applying a single process to form all electrode units of both capacitive sensing layers on a substrate therefore reducing the thickness of the touch sensing circuit.

Another object of the present invention is to provide a touch sensing circuit for a capacitive touch panel, which provides low impendence so as to increase the reliability of the touch panel.

Further object of the present invention is to provide a manufacture method for reducing the impendence and the thickness of a touch sensing circuit.

Further object of the present invention is to provide a touch panel having the touch sensing circuit of the present invention.

Further object of the present invention is to provide an electronic device having the touch panel of the present invention.

In general, the present invention discloses a touch sensing circuit for capacitive touch panel comprising a transparent conductive layer having a thickness of 100 Å-500 Å; a conductive layer having a thickness of 1000 Å-5000 Å; and an insulating layer having a thickness of 1 μm-5 μm disposed between the transparent conductive layer and the conductive layer.

Accordingly, the transparent conductive layer comprises at least two adjacent first electrode units, a first conductive line and at least two adjacent second electrode units. The first conductive line is located between the adjacent first electrode units to interconnect the adjacent first electrode units. The second electrode units are disposed on two sides of the first conductive line respectively.

In another aspect, the present invention also discloses a method of making a touch sensing circuit including: (a) forming a transparent conducive layer having a thickness of 100 Å-500 Å; (b) forming a conductive layer having a thickness of 1000 Å-5000 ÅA; and (c) forming an insulating layer having a thickness of 1 μm-5 μm disposed between the transparent conductive layer and the conductive layer.

Accordingly, the transparent conductive layer, comprises at least two adjacent first electrode units, a first conductive line and at least two adjacent second electrode units. The first conductive line is located between the adjacent first electrode units to interconnect the adjacent first electrode units. The second electrode units are disposed on two sides of the first conductive line respectively.

The present invention further discloses a capacitive touch panel comprising a substrate; a touch sensing circuit of present invention formed on the substrate for sensing a touch action thereon and generating corresponding, touch sensing signals; at least one first peripheral signal line formed on a first edge of the substrate and at least one second peripheral line formed on a second edge adjacent to the first edge of the substrate for conducting the touch sensing signals; and a controller for receiving and processing, said touch sensing signals.

The present invention further discloses an electronic device comprising a capacitive touch panel of present invention for sensing a touch action thereon and generating corresponding touch sensing signals; a processor for receiving and processing said touch sensing signals and generating corresponding display instruction signals; and a display for receiving said display instruction signals and displaying corresponding images.

The above summary is not intended to describe each embodiment or every implementation of the present disclosure. Advantages and attainments, together with a more complete understanding of the invention, will become apparent and be appreciated by referring to the following detailed description and claims taken in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Now referring more specifically to the figures, identical parts are designated by the same reference numerals throughout.

Figure 3:
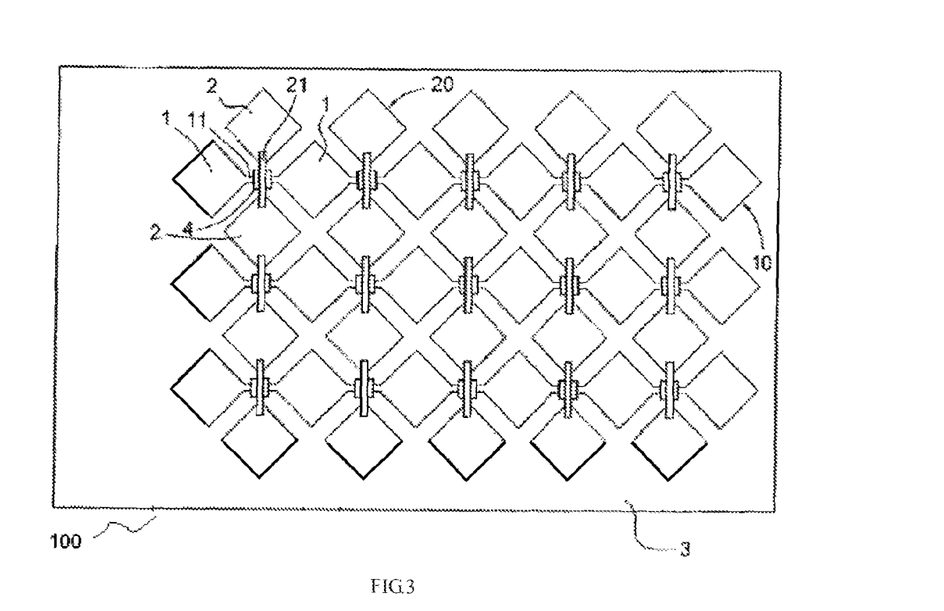
FIG. 3 is a schematic view of a touch sensing circuit in accordance with a first embodiment of present invention.

Referring to FIG. 3, a plan view of a touch sensing circuit for a capacitive touch panel according to the first embodiment of the present invention is shown. The touch sensing circuit 100 is formed on a surface of substrate 3. The touch sensing circuit 100 includes a plurality of first conductive elements 10 parallelly arranged in a first direction (such as a horizontal direction) and a plurality of second conductive elements 20 parallelly arranged in a second direction (such as a longitudinal direction). The first conductive elements 10 and the second conductive elements 20 are arranged perpendicular to each other, forming a matrix structure.

Each first conductive element 10 includes a plurality of first electrode units 1 arranged in an equal-spaced manner along the first direction. Each second conductive element 20 includes a plurality of second electrode units 2 arranged in an equal-spaced manner along the second direction. Adjacent first electrode units 1 are interconnected by a first conductive line 11 and adjacent second electrode units 2 are interconnected by a second conductive line 21. The adjacent second electrode units 2 are located on two sides of the first conductive line 11 respectively. The touch sensing circuit 100 further includes a plurality of insulators 4 disposed between the first conductive lines 11 and the second conductive lines 21, which are used to insulate the first conductive lines 11 from the second conductive lines 21.

In this way, the first electrode units 1 and the first conductive lines 11 constitute the first conductive elements 10 so as to form a first capacitive sensing layer. The second electrode units 2 and the second conductive lines 21 constitute the second conductive element 20 so as to form a second capacitive sensing layer. Therefore, the first capacitive sensing layer, the second capacitive sensing layer and the insulators 4 constitute the touch sensing circuit 100 shown in FIG. 3 In addition, the substrate 3 can be made of glass, plastic or other transparent insulating material.

The first electrode units 1 and the second electrode unit 2 are shaped as diamond. It is noticed that other polygon contour, such as hexagon, octagon, rectangle, square and triangle, can also be used as the shape of the first and second electrode units 1, 2. The first electrode units 1 the first conductive line 11 and the second electrode unit 2 are made of transparent conductive material, such as Indium Tim Oxide (ITO), Antimony Tin Oxide (ATO) or Titanium Oxide ($TiO_2$). The second conductive lines 21 are made of opaque conductive material, preferably metal, such as silver, copper, aluminum, gold and iron. The insulator 4 is made of transparent insulative material such as epoxy resin, polyimide, polyvinyl chloride and methyl methacrylate, or opaque insulative material such as ink.

In the first embodiment, the substrate 3 is made of transparent insulating material, such as glass. The first conductive elements 10 and the second conductive elements 20 can be arranged in an equal-spaced manner or in a non-equidistance manner. The first conductive elements 10 and the second conductive elements 20 can be arranged in a non-orthogonal manner to form a skew matrix structure. The first electrode units 1 and the second electrode units 2 also can be arranged in a non-equidistance manner along the first direction and the second direction respectively.

Figure 4:
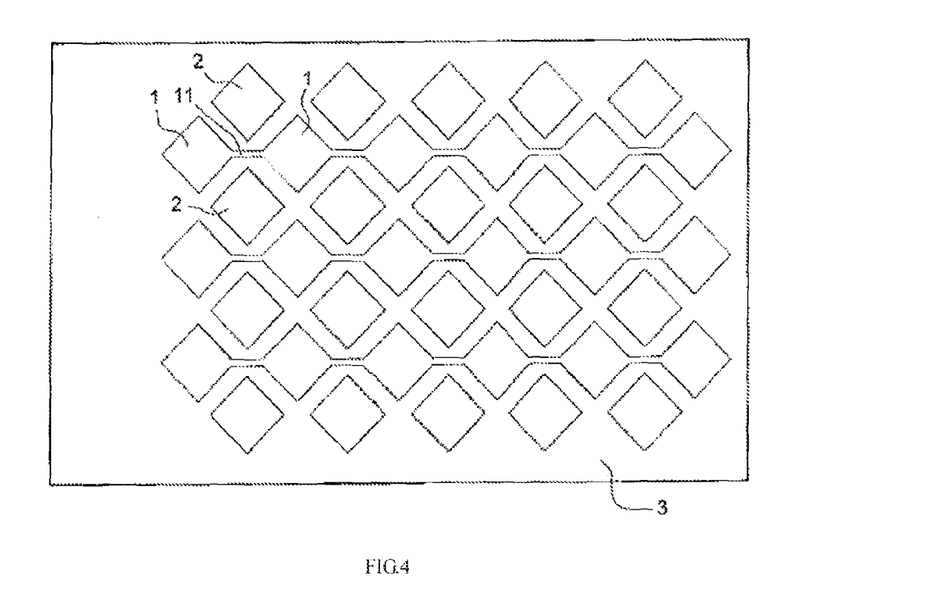
FIGS. 4-6 are schematic views of implementation steps for making a touch sensing circuit according to first embodiment of the present invention shown in FIG. 3.
Figure 5:
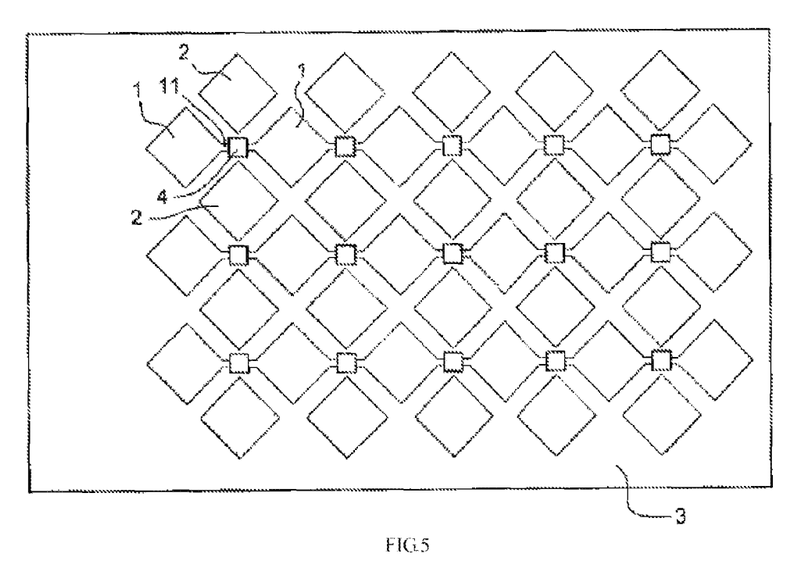
Figure 6:
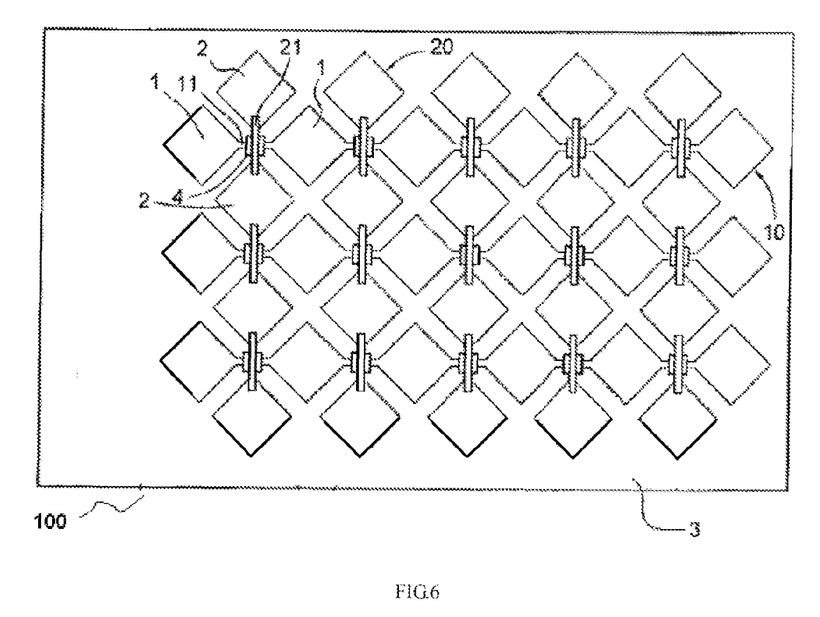

In this section, a manufacturing method of making the touch sensing circuit of the first embodiment will be depicted. FIGS. 4-6 are schematic views of implementation steps for making the touch sensing circuit according to the first embodiment shown in FIG. 3. The manufacturing method includes the following steps.

In the first step, as shown in FIG. 4, a plurality of the first conductive elements 10 and a plurality of second electrode units 2 are formed on the substrate 3. In detail, the first step comprises: sputtering a transparent conductive layer on the substrate 3; covering a mask over the sputtered substrate 3, and exposing the sputtered substrate 3 under a light to develop a pattern on the sputtered substrate 3; etching the patterned substrate 3 to form a first temporary pattern on the substrate 3. After the step is finished, a first temporary pattern is generated and is shown in FIG. 4. In this situation, adjacent first electrode units 1 are interconnected by the first conductive line 11, and the adjacent second electrode units 2 are separated from each other. The adjacent second electrode units 2 are located on two sides of the first conductive line 11 respectively. The first electrode units 1, the first conducive line 11 and the second electrode unit 2 are made of transparent conductive material, such as Indium Tim Oxide (ITO), Antimony Tin Oxide (ATO), and Titanium Oxide ($TiO_2$). The first electrode units 1 and the second electrode units 2 are shaped as diamond. It is noticed that other polygon contour, such as hexagon, octagon, rectangle, square and triangle, can also be used as the shape of the first and second electrode units 1, 2.

In the second step, as shown in FIG. 5, a plurality of insulators 4 are formed on the first temporary pattern shown in FIG. 4. In detail, this step further comprises: sputtering an insulating layer on the first temporary pattern shown in FIG. 4; covering a mask over the first temporary pattern, and exposing the sputtered first temporary pattern under a light, after which a second pattern will be developed on the sputtered first temporary pattern; etching the patterned substrate 3 to form a insulator 4 on each first conductive line 11. After this step is finished, a second temporary pattern is generated and is shown in FIG. 5. The insulators 4 are made of transparent insulative material such as epoxy resin, polyimide, polyvinyl chloride and methyl methacrylate, or opaque insulative material such as ink.

In the third step, a plurality of second conductive lines 21 are formed on the second temporary pattern shown in FIG. 6. In detail, this step further comprises: sputtering a conductive layer on the second temporary pattern; covering a mask over the sputtered second temporary pattern, and exposing the sputtered second temporary pattern under a light; etching the patterned substrate 3 to form the second conductive lines 21. After this step is finished, the touch sensing circuit 100 is generated as shown in FIG. 6. In the structure, the adjacent second electrode units are interconnected by a second conductive line 21 respectively. The second conductive lines 21 are made of opaque conductive material, preferably metal with high electronic conductivity, such as silver, copper, aluminum, gold and iron.

In the above manufacturing method, each step performed by the same photo lithography process comprises sputtering, exposing, developing and etching in turn as described above. In view of different manufacturing facilities, various application surroundings and different process requirements, the printing technology can be inducted into the manufacture method mentioned above to make the touch sensing circuit to be in accordance with the present invention.

As described above, the first electrode units 1 and the second electrode units 2 are formed on the surface of the transparent substrate 3 in the single photo lithography process. As such, the touch sensing circuit for capacitive touch panel can be manufactured by three predetermined photo lithography processes. The whole manufacturing process of making touch sensing circuit is very simple. Furthermore, because of the second conductive lines 21 are made of metal, resistance of the whole touch sensing circuit can be reduced effectively, and thus a sensitivity of signal transmission can be enhanced. In addition, relative to the conventional technique that the insulating layer covers the whole sensing layer, the insulators 4 are spaced from each other and are arranged in the matrix, which can improve light transmittance of the touch sensing circuit.

Figure 7:
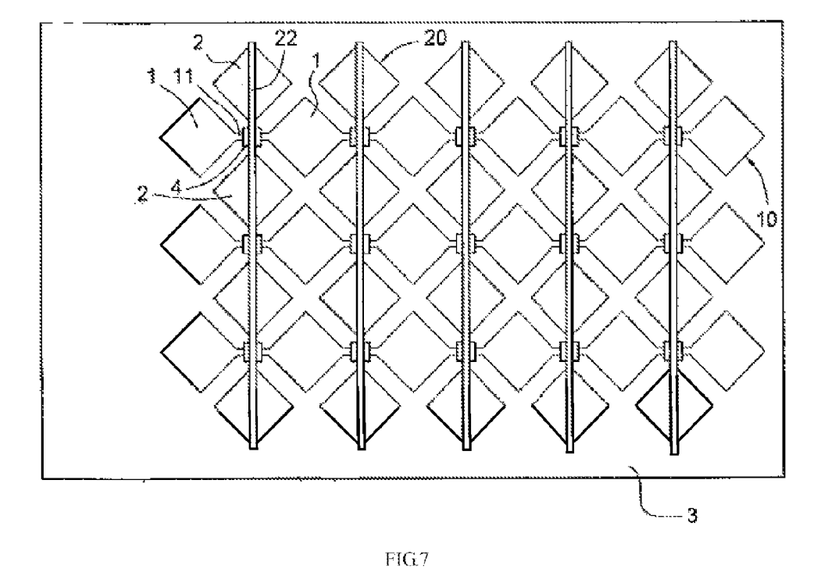
FIG. 7 is a schematic view of a touch sensing circuit in accordance with a second embodiment of present invention.

Referring to FIG. 7, a plan view of the second embodiment of the present invention is shown. The touch sensing circuit of the second embodiment is formed on a surface of the substrate 3. The touch sensing circuit includes a plurality of first conductive elements 10 parallelly arranged in a first direction (such as a horizontal direction) and a plurality of second conductive elements 20 parallelly arranged in a second direction (such as a longitudinal direction). The first conductive elements 10 and the second conductive elements 20 are arranged perpendicularly to each other, forming a matrix structure.

Each first conductive element 10 includes a plurality of first electrode units 1 arranged in an equal-spaced manner along the first direction. Each second conductive element 20 includes a plurality of second electrode units 2 arranged in an equal-spaced manner along the second direction. Adjacent first electrode units 1 are interconnected by a first conductive line 11 and all the second electrode units 2 of a second conductive element 20 are interconnected by a second conductive line 22. The adjacent second electrode units 2 are located on two sides of the first conductive line 11 respectively. The touch sensing circuit further includes a plurality of insulators 4 disposed between the first conductive lines 11 and the second conductive lines 22, which are used to insulate the first conductive lines 11 from the second conductive lines 22.

The touch sensing circuit of the second embodiment is very similar in principle to the touch sensing circuit of the first embodiment. In the first embodiment the adjacent second electrode units 2 of a second conductive element 20 are interconnected by a second conductive line 21. Compared with the first embodiment, the second embodiment uses an extended second conductive line 22 to interconnect all the second electrode units of a second conductive element 20. The manufacturing method of making the second embodiment is also very similar to the manufacturing method of making the first embodiment, wherein the only difference is that in the third step of making the second embodiment, the formed second conductive line 22 is connected to all the second electrode units 2 of a second conductive element 20.

Figure 8:
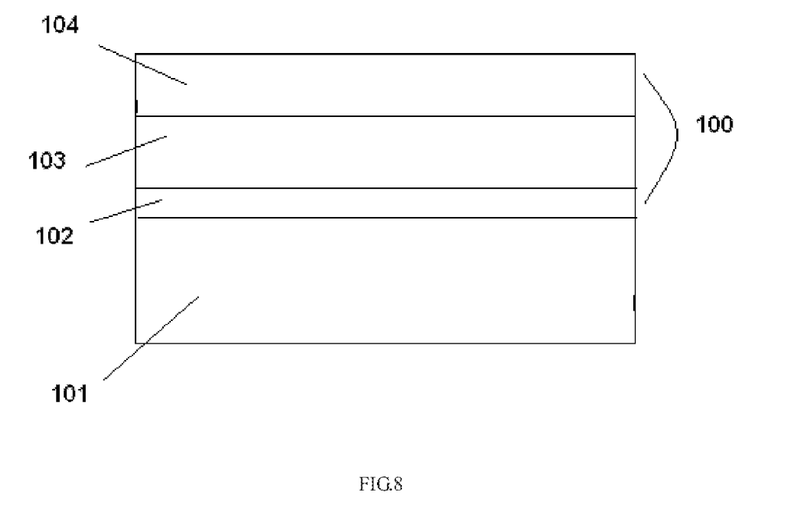
FIG. 8 is a side view of a touch sensing circuit in accordance with the first and second embodiments of present invention.

Referring to FIG. 8, a side view of a touch sensing circuit in accordance with the first and second embodiments of the present invention is shown. The touch sensing circuit 100 formed on transparent substrate 101 comprises a transparent conductive layer 102 for forming a plurality of first conductive elements 10 and a plurality of second electrode units 2; and an insulating layer 103 for forming a plurality of insulators 4 and a conductive layer 104 to form the second conductive lines 21, 22. In the above mentioned structure, the transparent substrate 101 is normally made of glass and has a thickness of 0.2 mm-1 mm, preferably 0.55 mm; the transparent conductive 102 is made of transparent conductive material, such as Indium Tim Oxide (ITO), Antimony Tin Oxide (ATO) or Titanium Oxide ($TiO_2$), and has a thickness of 100 Å-500 Å, preferably 220 Å; the insulating layer 103 is made of transparent insulative material, such as epoxy resin, polyimide, polyvinyl chloride and methyl methacrylate, and has a thickness of 1 μm-5 μm, preferably 2 μm; the conductive layer 104 is made of opaque conductive material, preferably metal, such as silver, copper, aluminum, gold and iron, and has a thickness of 1000 Å-5000 Å, preferably 3000 Å.

Figure 9:
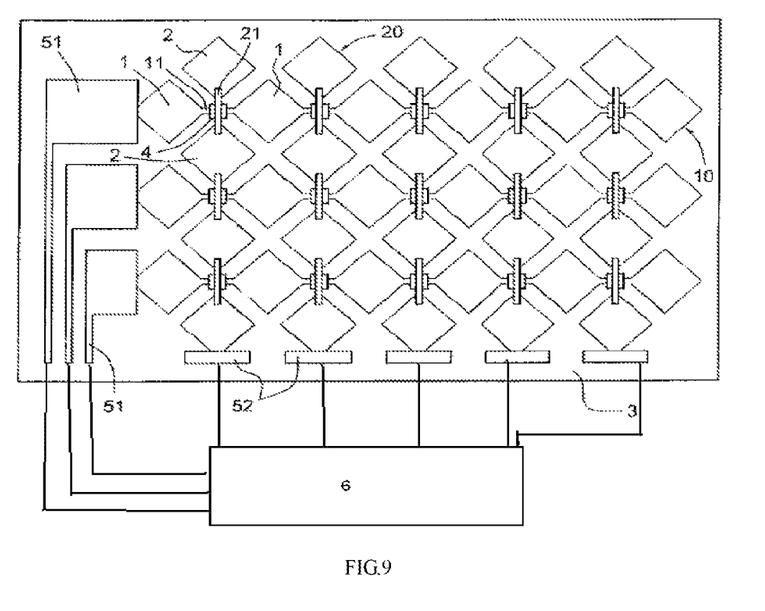
FIG. 9 is a schematic view of a capacitive touch panel having the touch sensing circuit in accordance with the first embodiment of present invention.

FIG. 9 shows a capacitive touch panel having the touch sensing circuit in accordance with the first embodiment of the present invention. The capacitive touch panel comprises a touch sensing circuit of the first embodiment for sensing a touch action thereon and generating corresponding touch sensing signals, a plurality of first peripheral signal lines 51 and a plurality of second peripheral signal lines 52 are respectively formed on a first edge and a second edge adjacent to the first edge of the substrate 3 for conducting the touch sensing signal, and a controller 6 for receiving and processing said touch sensing signals. Each first peripheral signal line 51 is connected to a corresponding first conductive element 10 respectively, and each second peripheral signal line 52 is connected to a corresponding second conductive element 20 respectively.

The first peripheral signal lines 51 and the second peripheral signal lines 52 can be formed with the first conductive elements 10 and the second electrode units 2 simultaneously. In this case, the first peripheral signal lines 51 and second peripheral signal lines 52 are preferably made of transparent conductive material, such as Indium Tim Oxide (ITO), Antimony Tin Oxide (ATO), and Titanium Oxide (TiO$_2$), and the thickness of the first peripheral signal lines 51 and the second peripheral signal lines 52 is the same as that of the transparent conductive layer 102. Besides, the first peripheral signal lines 51 and the second peripheral signal lines 52 can also be formed with the second conductive lines 21/22 simultaneously. In this case, the first peripheral signal lines 51 and the second peripheral signal lines 52 are made of opaque conductive material, preferably metal with high electronic conductivity, such as silver, copper, aluminum, gold and iron, and the thickness of the first peripheral signal lines 51 and the second peripheral signal lines 52 is the same as that of the conductive layer 104. Furthermore, the first peripheral signal fines 51 and the second peripheral signal lines 52 can be formed in separate manufacturing processes.

Figure 10:
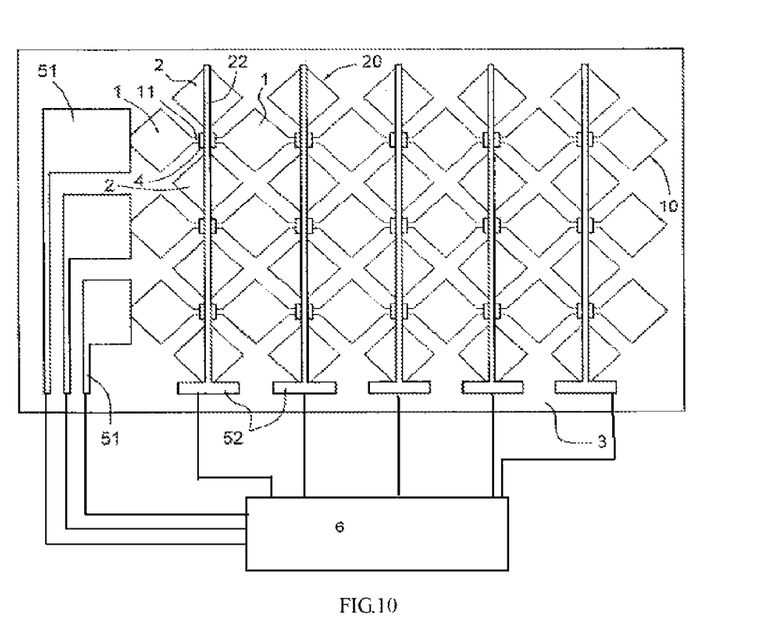
FIG. 10 is a schematic view of a capacitive touch panel having the touch sensing circuit in accordance with the second embodiment of present invention.

FIG. 10 shows a capacitive touch panel having the touch sensing circuit in accordance with the second embodiment of the present invention. The capacitive touch panel comprises a touch sensing circuit of the second embodiment for sensing a touch action thereon and generating corresponding touch sensing signals; a plurality of first peripheral signal lines 51 and a plurality of second peripheral signal lines 52 are respectively formed on a first edge and a second edge adjacent to the first edge of the substrate 3 for conducting the touch sensing signal; and a controller 6 for receiving and processing said touch sensing signals. Each first peripheral signal line 51 is connected to a corresponding first conductive element 10 respectively, and each second peripheral signal line 52 is connected to a corresponding second conductive element 20 respectively.

Same as the capacitive touch panel having the touch sensing circuit of the first embodiment, The first peripheral signal lines 51 and the second peripheral signal lines 52 of the capacitive touch panel having the touch sensing circuit of the second embodiment can be formed with the first conductive elements 10 and the second electrode units 2 simultaneously. In this case, the first peripheral signal lines 51 and the second peripheral signal lines 52 are preferably made of transparent conductive material, such as Indium Tim Oxide (ITO), Antimony Tin Oxide (ATO), and Titanium Oxide (TiO$_2$), and the thickness of the first peripheral signal lines 51 and the second peripheral signal lines 52 is the same as that of the transparent conductive layer 102. Besides, the first peripheral signal lines 51 and second peripheral signal lines 52 can also be formed with the second conductive lines 21/22 simultaneously. In this case, the first peripheral signal lines 51 and the second peripheral signal lines 52 are made of opaque conductive material, preferably metal with high electronic conductivity, such as silver, copper, aluminum, gold and iron, and the thickness of the first peripheral signal lines 51 and the second peripheral signal lines 52 is the same as that of the conductive layer 104. Furthermore, the first peripheral signal lines 51 and second peripheral signal lines 52 can be formed in separate manufacturing processes.

Figure 11:
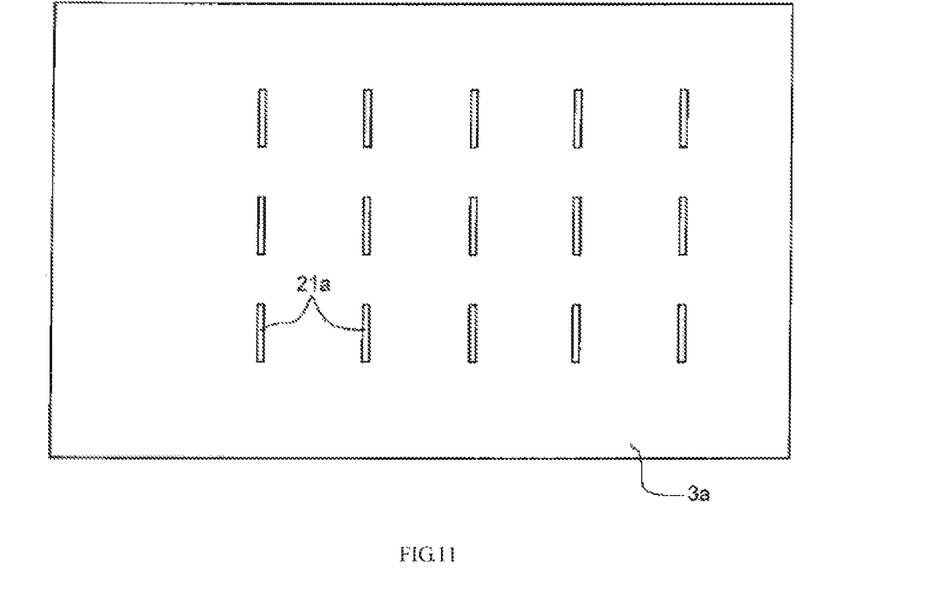
FIGS. 11-13 are schematic views of implementation steps for making a touch sensing circuit according to third embodiment of the present invention.
Figure 12:
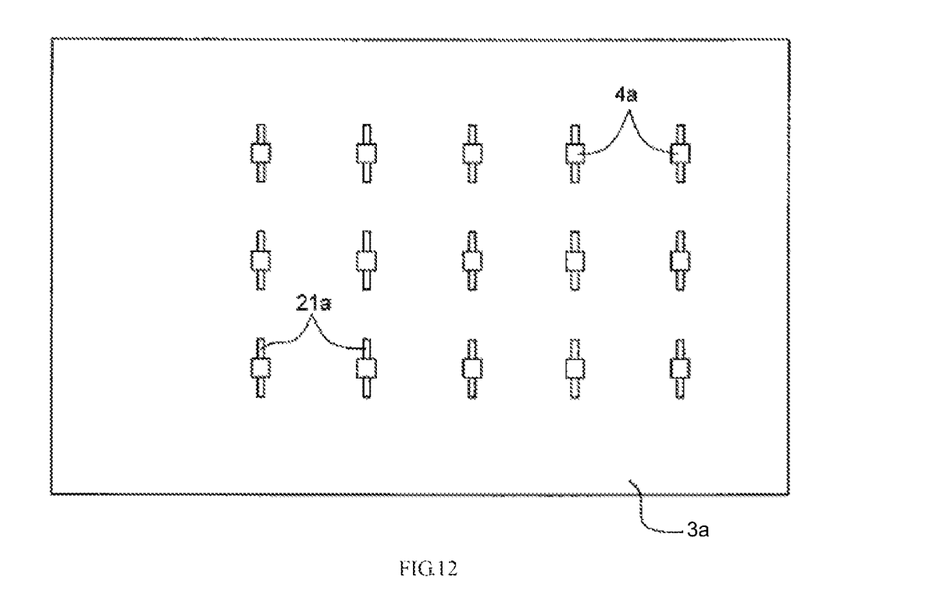
Figure 13:
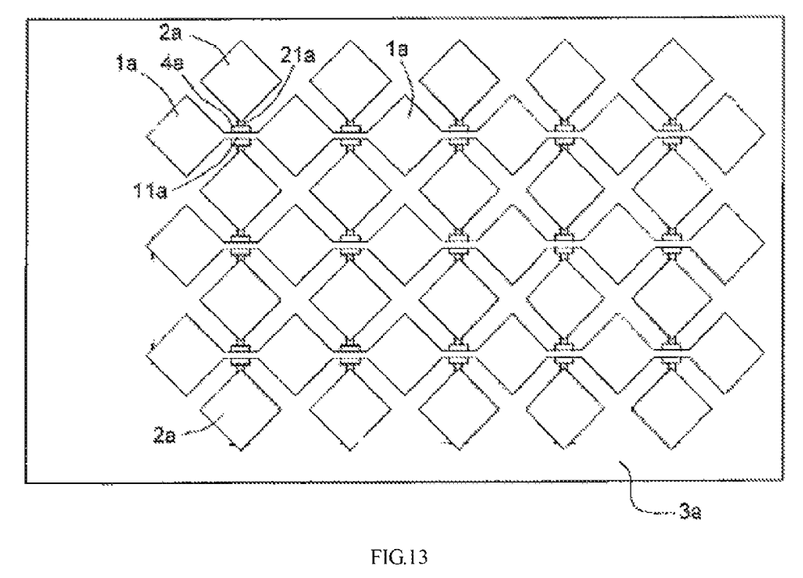

In this section, a manufacturing method of making the touch sensing circuit of the third embodiment will be depicted. FIGS. 11-13 are schematic views of implementation steps for making the touch sensing circuit according to third embodiment. The manufacturing method includes following steps.

In the first step, as shown in FIG. 11, a plurality of second conductive, lines 21a are formed on the substrate 3a. In detail, the step comprises: sputtering a conductive layer on the substrate 3a; covering a mask over the sputtered substrate 3a, and exposing the sputtered substrate 3a under a light to develop a pattern on the sputtered substrate 3a; and finally, etching the patterned substrate 3a to form a fourth temporary pattern on the substrate. After the step is finished, a fourth temporary pattern is generated as shown in FIG. 11. The second conductive lines 21a are made of opaque conductive material, preferably metal with high electronic conductivity, such as silver, copper, aluminum, gold and iron.

In the second step, as shown in FIG. 12, a plurality of insulators 4a are formed on the first temporary pattern shown in FIG. 11. In detail, this step further comprises: sputtering an insulating layer on the fourth temporary pattern shown in FIG. 11; covering a mask over the fourth temporary pattern, and exposing the sputtered fourth temporary pattern under a light to develop a pattern on the sputtered fourth temporary pattern; etching the patterned substrate 3a to form a insulator 4a on each second conductive line 21a. After this step is finished, a fifth temporary pattern is generated as shown in FIG. 12. The insulators 4a are made of transparent insulative material such as epoxy resin, polyimide, polyvinyl chloride and methyl methacrylate, or opaque insulative material such as ink.

Figure 14:
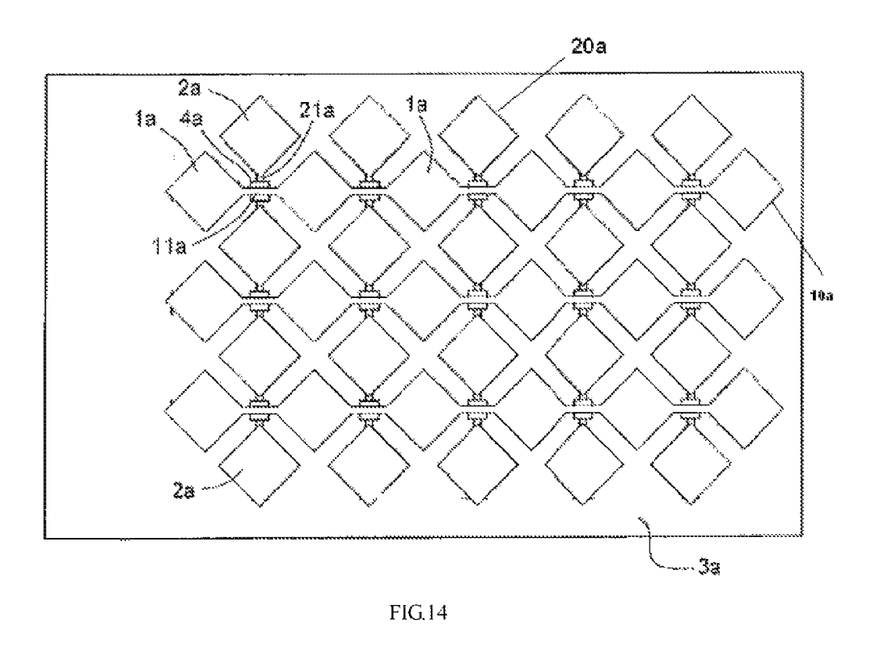
FIG. 14 is a schematic view of a touch sensing circuit in accordance with a third embodiment of present invention.

In the third step, a plurality of the first conductive elements 10a and a plurality of second electrode units 2a are formed on the fifth temporary pattern shown in FIG. 12. In detail, this step further comprises: sputtering a transparent conductive layer on the fifth temporary pattern; covering a mask over the sputtered fifth temporary pattern, and exposing the sputtered fifth temporary pattern under a light; etching the patterned substrate 3a to form a plurality of first electrode units 1a, the first conductive lines 11a and the second electrode units 2a as shown in FIG. 13. After this step is finished, the touch sensing circuit is generated as shown in FIG. 14. The first electrode units 1a, the first conducive line 11a and the second electrode unit 2a are made of transparent conductive material, such as Indium Tim Oxide (ITO), Antimony Tin Oxide (ATO) or Titanium Oxide (TiO$_2$), The first electrode units 1 and the second electrode unit 2 are shaped as diamond. It is noticed that other polygon contour, such as hexagon, octagon, rectangle, square and triangle, can also be used as the shape of the first and second electrode units 1a, 2a.

Referring to FIG. 14, a plan view of a touch sensing circuit for capacitive touch panel according to the third embodiment of the present invention is shown. The touch sensing circuit 100 is formed on a surface of substrate 3a. The touch sensing circuit 100a includes a plurality of first conductive elements 10a parallelly arranged in a first direction (such as horizontal direction) and a plurality of second conductive elements 20a parallelly arranged in a second direction (such as longitudinal direction). The first conductive elements 10a and the second conductive elements 20a are arranged perpendicular to each other, forming a matrix structure.

Each first conductive element 10a includes a plurality of first electrode units 1a arranged in an equal-spaced manner along the first direction. Each second conductive element 20a includes a plurality of second electrode units 2a arranged in an equal-spaced manner along the second direction. Adjacent first electrode units 1a are interconnected by a first conductive line 11a and adjacent second electrode. Units 2a are interconnected by a second conductive line 21a. The adjacent second electrode units 2a are located on two sides of the first conductive line 11a respectively. The touch sensing circuit 100a further includes a plurality of insulators 4a disposed between the first conductive lines 11a and the second conductive lines 21a, which are used to insulate the first conductive lines 11a from the second conductive lines 21a.

Figure 15:
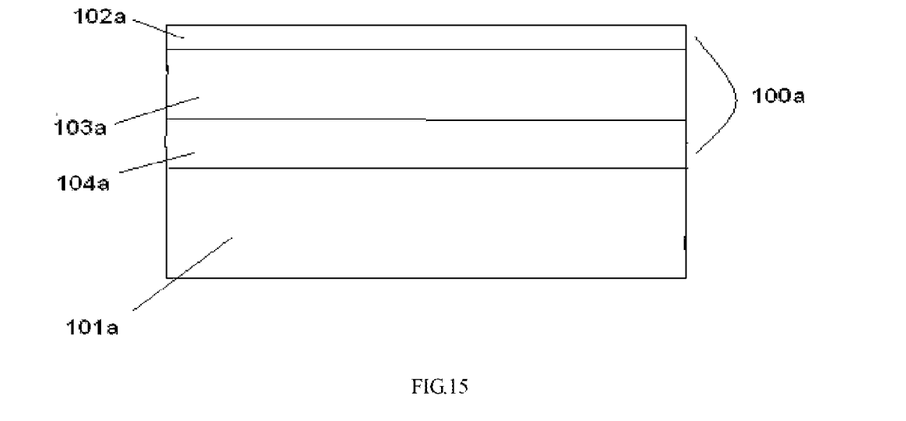
FIG. 15 is a side view of a touch sensing circuit in accordance with the third embodiment of present invention.

The touch sensing circuit of the third embodiment is similar in principle to the touch sensing circuit of the first embodiment, and the difference lies in a sequence in which different components are formed on a substrate:

Referring to FIG. 15, a side view of a touch sensing circuit in accordance with the third embodiments of the present invention is shown. The touch sensing circuit 100a is formed on a transparent substrate 101a, comprising a conductive layer 104a to form the second conductive lines 21a; an insulating layer 103a for forming a plurality of insulators 4a and a transparent conductive layer 102a for forming a plurality of first conductive elements 10a and a plurality of second electrode units 2a. In the above mentioned structure, the transparent substrate 101a is normally made of glass and has a thickness of 0.2 mm-1 mm, preferably 0.55 mm; transparent conductive 102a is made of transparent conductive material, such as Indium Tim Oxide (ITO), Antimony Tin Oxide (ATO), and Titanium Oxide ($TiO_2$), and has a thickness of 100 Å-500 Å, preferably 220 Å; the insulating layer 103a is made of transparent insulative material, such as epoxy resin, polyimide, polyvinyl chloride and methyl methacrylate, and has a thickness of 1 µm-5 µm, preferably 2 µm; the conductive layer 104a is made of opaque conductive material, preferably metal, such as silver, copper, aluminum, gold and iron, and has a thickness of 1000 Å-5000 Å, preferably 3000 Å.

Figure 16:
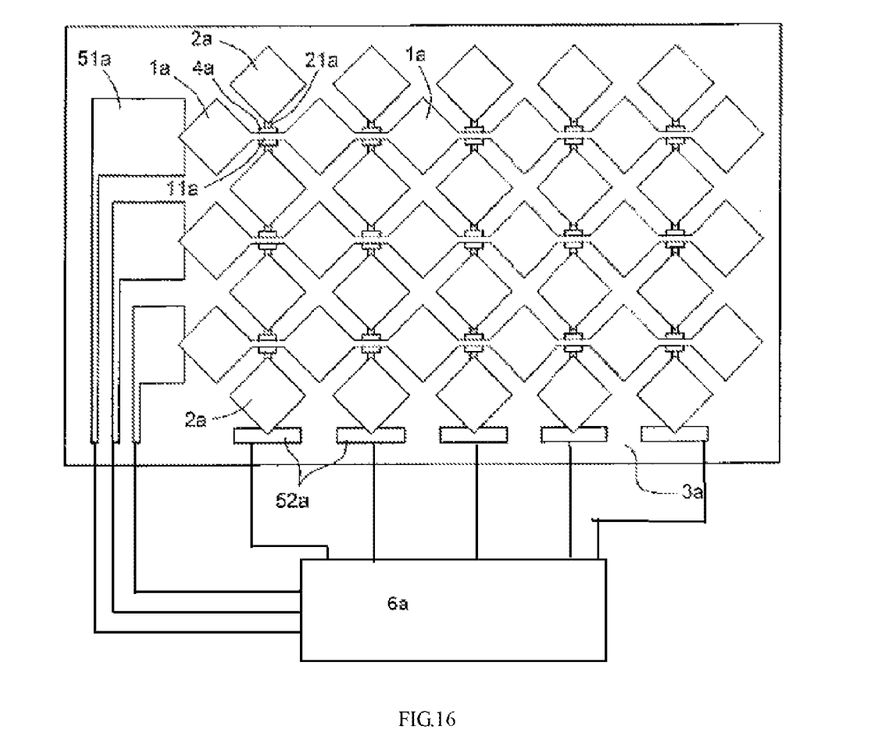
FIG. 16 is a schematic view of a capacitive touch panel having the touch sensing circuit in accordance with the third embodiment of present invention.

FIG. 16 shows a capacitive touch panel having the touch sensing circuit in accordance with the third embodiment of the present invention. The capacitive touch panel comprises a touch sensing circuit of the third embodiment for sensing a touch action thereon and generating corresponding touch sensing signals; a plurality of first peripheral signal lines 51a and a plurality of second peripheral signal lines 52a are respectively formed on a first edge and a second edge adjacent to the first edge of the substrate 3a for conducting the touch sensing signal, and a controller 6a for receiving and processing said touch sensing signals. Each first peripheral signal line 51a is connected to a corresponding first conductive element 10a respectively, and each second peripheral signal line 52a is connected to a corresponding second conductive element 20a respectively.

The first peripheral signal lines 51a and the second peripheral signal lines 52a can be formed with the first conductive elements 10a and the second electrode units 2a simultaneously. In this case, the first peripheral signal lines 51a and the second peripheral signal lines 52a are preferably made of transparent conductive material, such as Indium Tim Oxide (ITO), Antimony Tin Oxide (ATO), and Titanium Oxide ($TiO_2$), and the thickness of the first peripheral signal lines 51a and the second peripheral signal lines 52a is the same as that of the transparent conductive layer 102a. Besides, the first peripheral signal lines 51a and second peripheral signal lines 52a also can be formed with the second conductive lines 21a simultaneously. In this case, the first peripheral signal lines 51a and the second peripheral signal lines 52a are made of opaque conductive material, preferably metal with high electronic conductivity, such as silver, copper, aluminum, gold and iron, and the thickness of the first peripheral signal lines 51a and second peripheral signal lines 52a is the same as that of the conductive layer 104a. Furthermore, the first peripheral signal lines 51a and second peripheral signal lines 52a can be formed in separate manufacturing processes.

The capacitive touch panels of present invention also have other components. The following description illustrates other components of the capacitive touch panel of the present invention.

Figure 17:
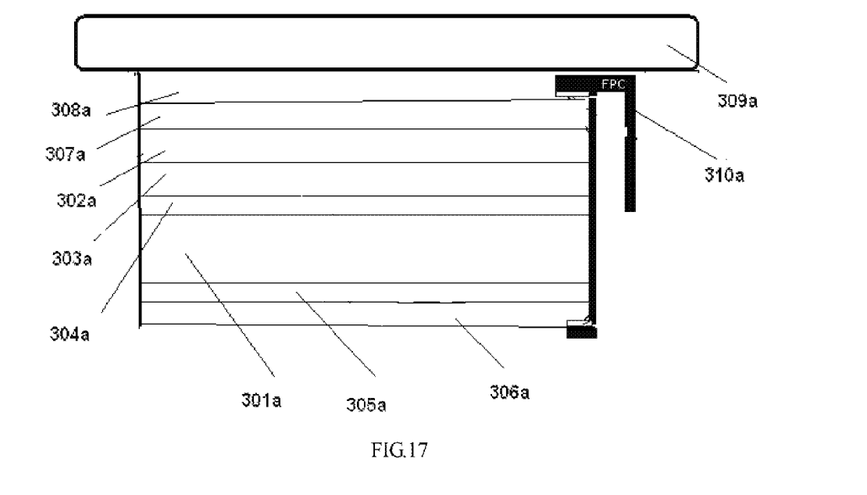
FIG. 17 is a side view of the capacitive touch panel having the touch sensing circuit in accordance with the first and second embodiment of present invention.

Referring to FIG. 17, a side view of the capacitive touch panel having the touch sensing circuit in accordance with the first and second embodiment of the present invention is shown. The capacitive touch panel comprises a substrate 301; a transparent conductive layer 302 formed on the substrate 301; an insulating layer 303 formed on the transparent conductive layer 302; a conductive layer 304 formed on the insulating layer 303; a shield layer 305 formed on the other side of the substrate 301 for preventing the interference of outside electronic signals; a back side passivation layer 306 formed on the shield layer 305 for protecting the touch panel; a front side passivation layer 307 formed on the conductive layer 304; a cover glass 309; an adhesive layer 308 for connecting the front side passivation layer 307 and the cover glass 309 and a controller 310 (FPC).

In the above mentioned structure, the substrate 301, the transparent conductive layer 302, the insulating layer 303 and the conductive layer 304 are corresponding to the figure shown in FIG. 8, the thickness of these layers has been described, so there is ho need to elaborate. The thickness of other layer will be depicted. The thickness of the shield layer 305 is about 100 Å-500 Å, preferably 220 Å; the thickness of the side passivation layer 306 is about 200 Å-800 Å, preferably 500 Å; the thickness of the front side passivation layer 307 is about 1 µm-5 µm, preferably 2 µm; the thickness of the cover glass 309 is about 0.2 mm-1 mm, preferably 0.55 mm; the thickness of the adhesive layer 308 is about 1 mm-3 mm; preferably 0.175 mm.

Figure 18:
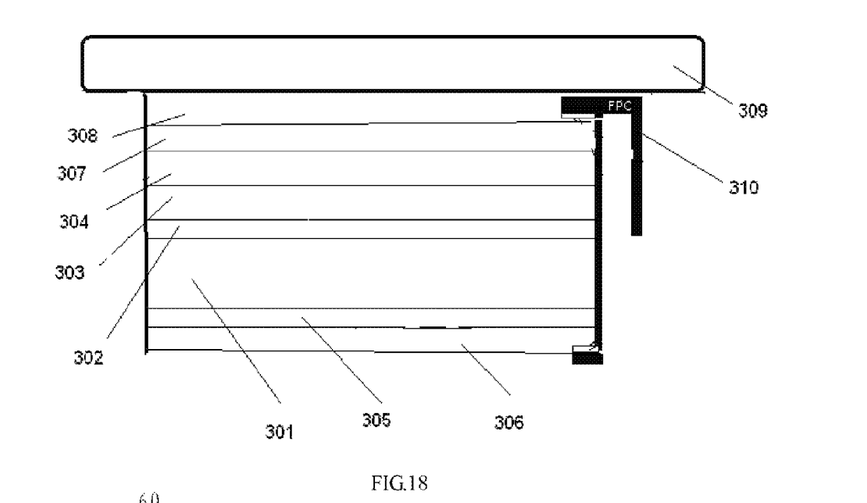
FIG. 18 is a side view of the capacitive touch panel having the touch sensing circuit in accordance with the third embodiment of present invention.

Referring to FIG. 18, a side view of the capacitive touch panel having the touch sensing circuit in accordance with the third embodiment of present invention is shown. The capacitive touch panel comprises a substrate 301a; a transparent conductive layer 302a formed on the substrate 301a; an insulating layer 303 formed on the transparent conductive layer 302a; a conductive layer 304a formed on the insulating layer 303a; a shield layer 305 formed on the other side of the substrate 301a for preventing the interference of outside electronic signals; a back side passivation layer 306a formed on the shield layer 305a for protecting the touch panel; a front side passivation layer 307a formed on the conductive layer 304a; a cover glass 309a; an adhesive layer 308 for connecting the front side passivation layer 307a and the cover glass 309 and a controller 310a (FPC).

In the above mentioned structure, the substrate 301a, the transparent conductive layer 302a, the insulating layer 303a and the conductive layer 304a are corresponding to the figure shown in FIG. 15. The thickness of the shield layer 305a is about 100 Å-500 Å, preferably 220 Å; the thickness of the side passivation layer 306a is about 200 Å-800 Å, preferably 500 Å; the thickness of the front side passivation layer 307a is about 1 µm-5 µm, preferably 2 µm; the thickness of the cover glass 309a is about 0.2 mm-1 mm, preferably 0.55 mm; the thickness of the adhesive layer. 308a is about 1 mm-3 mm, preferably 0.175 mm.

Figure 19:
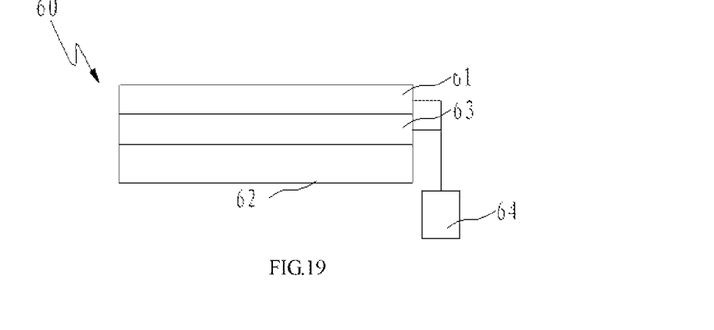
FIG. 19 is a schematic view of an electronic device having the capacitive touch panel in accordance with the invention.

The capacitive touch panel in accordance with present invention can be combined with a display, such as liquid display screen, to construct an electronic device. An electronic device having the capacitive touch panel of the present invention is shown in FIG. 19. An electronic device 60 comprises a capacitive touch panel 61 for sensing a touch action thereon and generating corresponding touch sensing signals; a processor 64 for receiving and processing said touch sensing signals and generating corresponding display instruction signals; and a display 62 for receiving said display instruction signals and displaying corresponding images. An adhesive layer 63 disposed between the capacitive touch panel 61 and the display 62 is used to combine the capacitive touch panel 61 with the display 62.

Touch panel 61 can be disposed on the display 62. Normally, the display comprises upper substrate, lower substrate, a pixel unit disposed between the upper substrate and the lower substrate and a blocking layer having a plurality of black matrixes for blocking light. Preferably, the second conductive lines of the touch sensing circuit of present invention can be aligned with the black matrixes for enhancing the light transmittance of the touch panel 61.

The touch sensing circuit of the present invention also can be used in the display, such as disposed on the upper face of the lower substrate or the lower face of the upper substrate. In this case, the upper substrate or the lower substrate can also used for the substrate where the touch sensing circuit can be formed. When the touch sensing circuit of the present invention is used in a display panel, the second conductive line can be stacked with the blocking layer that includes a number of black matrixes for blocking light. In an alternative embodiment, the blocking layer can be omitted, and the second conductive line is used as a blocking element for blocking light in the display. Furthermore, due to that the second conductive lines are made of metal, resistance between the second electrode units and the second peripheral signal lines can be reduced effectively, and thus the sensitivity of signal transmission between the second electrode units and the second peripheral signal lines can be enhanced. In addition, relative to the conventional technique of the insulation layer covers the whole sensing layer; the insulators 4 that are spaced with each other and arranged in the matrix, which can also improve light transmittance of the display.

The above mentioned description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A touch panel, comprising:
a substrate;
a touch sensing circuit formed on a first surface of the substrate; wherein the touch sensing circuit comprises:
    a plurality of first electrode units arranged in a first direction;
    a plurality of second electrode units arranged in a second direction;
    a plurality of first conductive lines for providing connection between the plurality of first electrode units, wherein a first conductive line of the plurality of first conductive lines is connected between adjacent first electrode units;
    a plurality of second conductive lines for providing connection between the plurality of second electrode units without establishing an electrical connection between the plurality of first electrode units and the plurality of second electrode units, wherein a second conductive line of the plurality of the second conductive lines is connected between adjacent second electrode units; and
    an insulating layer disposed between the first conductive line and the second conductive line, wherein the insulating layer comprises a plurality of insulators, wherein each of the plurality of insulators is spaced apart from another of the plurality of insulators in a matrix manner so that each of the plurality of insulators is disposed between a corresponding first conductive line and a corresponding second conductive line;
a front side passivation layer formed on the touch sensing circuit, wherein the front side passivation layer has a thickness of 1 µm-5 µm; and
a shield layer formed on a second surface of the substrate, wherein the shield layer has a thickness of about 100 Å-500 Å.

2. The touch panel of claim 1, wherein:
the first electrode units, the second electrode units and the first conductive line are made of a transparent conductive layer having a thickness of 100 Å-500 Å; and
the second conductive line is made of a metal layer having a thickness of 1000 Å-5000 Å.

3. The touch panel of claim 2, further comprising a plurality of peripheral signal lines, wherein a material and a thickness of the peripheral signal lines are identical to a material and a thickness of the metal layer.

4. The touch panel of claim 2, further comprising a plurality of peripheral signal lines, wherein a material and a thickness of the peripheral signal lines are identical to a material and a thickness of the transparent conductive layer.

5. The touch panel of claim 1, wherein the second conductive line is a continuous conductive line formed on at least two of the second electrode units and extends along the second direction.

6. The touch panel of claim 1, wherein a first insulator of the plurality of insulators is formed on the first conductive line and wherein the second conductive line is formed on the first insulator, or wherein the first insulator is formed on the second conductive line and the first conductive line is formed on the first insulator.

7. The touch panel of claim 1, wherein the first electrode units and the second electrode units have a shape of a polygon.

8. The touch panel of claim 1, further comprising at least one first peripheral signal line formed on a first edge of the substrate and at least one second peripheral signal line formed on a second edge of the substrate.

9. The touch panel of claim 1, wherein the substrate is made of glass and has a thickness of 0.2 mm-1 mm.

10. The touch panel of claim 1, further comprising: a back side passivation layer formed on the shield layer, wherein the back side passivation layer has a thickness of about 200 Å-800 Å.

11. The touch panel of claim 1, wherein the each of the plurality of insulators is made of a transparent insulative material or an opaque insulative material.

12. The touch panel of claim 11, wherein the transparent insulative material comprises epoxy resin, polyimide, polyvinyl chloride or methyl methacrylate, and the opaque insulative material comprises ink.

13. The touch panel of claim 1, wherein each of the plurality of insulators has a thickness of 1 um-5 um.

14. The touch panel of claim 1, wherein each of the plurality of insulators has a thickness of 2 um.

15. The touch panel of claim 1, further comprising a cover glass attached to the front side passivation layer.

16. A touch panel, comprising:
a substrate;
a touch sensing circuit formed on a first surface of the substrate; wherein the touch sensing circuit comprises:
  a plurality of first electrode units arranged in a first direction;
  a plurality of second electrode units arranged in a second direction;
  a plurality of first conductive lines for providing connection between the plurality of first electrode units, wherein a first conductive line of the plurality of first conductive lines is connected between adjacent first electrode units;
  a plurality of second conductive lines for providing connection between the plurality of second electrode units without establishing an electrical connection between the plurality of first electrode units and the plurality of second electrode units, wherein a second conductive line of the plurality of the second conductive lines is connected between adjacent second electrode units; and
  an insulating layer disposed between the first conductive line and the second conductive line, wherein the insulating layer comprises a plurality of insulators, wherein each of the plurality of insulators is spaced apart from another of the plurality of insulators in a matrix manner so that each of the plurality of insulators is disposed between a corresponding first conductive line and a corresponding second conductive line;
a front side passivation layer formed on the touch sensing circuit, wherein the front side passivation layer has a thickness of 1 μm-5 μm; and
a cover glass attached to the front side passivation layer, wherein the cover glass has a thickness of about 0.2 mm-1 mm.

17. The touch panel of claim 16, further comprising an adhesive layer connecting between the front side passivation layer and the cover glass, wherein the adhesive layer has a thickness of about 1 mm-3 mm.

18. The touch panel of claim 16, wherein:
the first electrode units, the second electrode units and the first conductive line are made of a transparent conductive layer having a thickness of 100 Å-500 Å; and
the second conductive line is made of a metal layer having a thickness of 1000 Å-5000 Å.

19. The touch panel of claim 16, further comprising at least one first peripheral signal line formed on a first edge of the substrate and at least one second peripheral signal line formed on a second edge of the substrate.

20. The touch panel of claim 16, further comprising a shield layer formed on a second surface of the substrate and a back side passivation layer formed on the shield layer.

* * * * *